T. GENSMER

1,624,097

AUTOMATIC CHANGE SPEED TRANSMISSION APPARATUS

Filed Feb. 23, 1926 6 Sheets-Sheet 6

Inventor,
Theodore Gensmer,
Attorney,
Horace Barnes.

Patented Apr. 12, 1927.

1,624,097

UNITED STATES PATENT OFFICE.

THEODORE GENSMER, OF PORTLAND, OREGON, ASSIGNOR TO AUTOMATIC TRANSMISSION COMPANY, A CORPORATION OF OREGON.

AUTOMATIC CHANGE-SPEED TRANSMISSION APPARATUS.

Application filed February 23, 1926. Serial No. 89,914.

This invention relates to improvements in automatic variable speed transmission apparatus of the gearless type; and particularly to that form of transmission devices shown and described in patent application Serial No. 757,784, filed December 24, 1924, by myself and Robert Z. Farmer.

The object of my invention is the provision of apparatus of simple construction to convey power from an automobile motor to the rear drive wheels at variable speeds and which will automatically shift in the speed ratios from high to low and vice versa as less or more power is required to maintain the progress of the vehicle.

A further object of the invention is the provision of a clutch apparatus of novel form and actuated by a centrifugal governor whereby increased radius of action in intermediate speeds is obtained, and the flow of power from high speeds to low in forward motion is with greater smoothness and positivity of action.

A still further object of the invention is the provision of improved reverse motion mechanism whereby but one set of reversing rollers are employed, as in the forward motion apparatus.

Other objects and advantages, and objects relating to details of construction and arrangement of parts will be readily apparent in the course of the detailed description to follow.

The accompanying drawings illustrate by way of example an embodiment of my invention in which.

Referring to said views, wherein similar reference numerals indicate like parts in the various views, the reference numeral 1 indicates the lower-half section of the external housing of my improved variable speed transmission apparatus and 2 the upper half-section thereof. Said lower section may be formed with laterally directed lugs 3 through which it may be rigidly secured to the frame of the automobile chassis. Said housing is formed in bi-lateral symmetry and its longitudinal axis is in line with the similar axis of the car. The housing sections are rigidly clamped together through laterally directed flanges 5 provided with bolt-holes 6.

A circular bearing-plate 7 is provided, formed with lugs 8 laterally projecting from its periphery which are supported upon ledges 10 extending inwardly from the lower housing section 1 and which are depressed from the level of the flanges 5 by the thickness of the lugs 8. With the lugs mounted on said ledges the bearing-plate 7 will be rigidly secured when the upper half-section 2 of the housing is secured in its position. The forces directed against said bearing-plate being in a reversed direction a stop 11 is provided at the rear end of each of the lugs 8.

The bearing-plate 7 is formed on its forward side with an annular chamber 12 having its exterior wall 13 disposed concentrically with and in parallel with the axis of the housing. Said bearing-plate is formed centrally with a circular opening within which the hub 15 of the cylinder 16 is rotatably mounted.

The cylinder 16 is positioned forwardly of said bearing-plate and is formed with an interior chamber 17 of circular form which is open at its forward end. The forward portion of the wall of the cylinder chamber 17 is inclined to the axis of the apparatus providing a conical bearing-face 18 tapering toward the rear of the cylinder.

A plurality of pivotal pins 20 are secured into the main body of the said cylinder extending into the annular chamber 12 of the bearing-plate, upon each of which a clutch-dog 21 is pivotally mounted and yieldingly pressed into an engagement at its outer end with the wall 13 by a spring 22. The outer end of each of said pins is beveled to provide an engaging-point bearing upon said outer wall 12 whereby the cylinder may be rotated in the same rotary direction that propels the vehicle in forward directions but that upon the reverse motion of said cylinder the dogs 21 will clutch the wall 13 to prevent such reverse motion of the cylinder.

A driving member 23 is rotatably mounted axially of the housing being suitably journaled at both ends thereof as will be hereinafter more fully described.

Said driving member is formed at a point opposite the bearing-face 18 of the cylinder with a cone portion 25 whose conical surface is inclined in parallel with the inclination of said bearing-face.

Figures 8, 9, 10, 11:
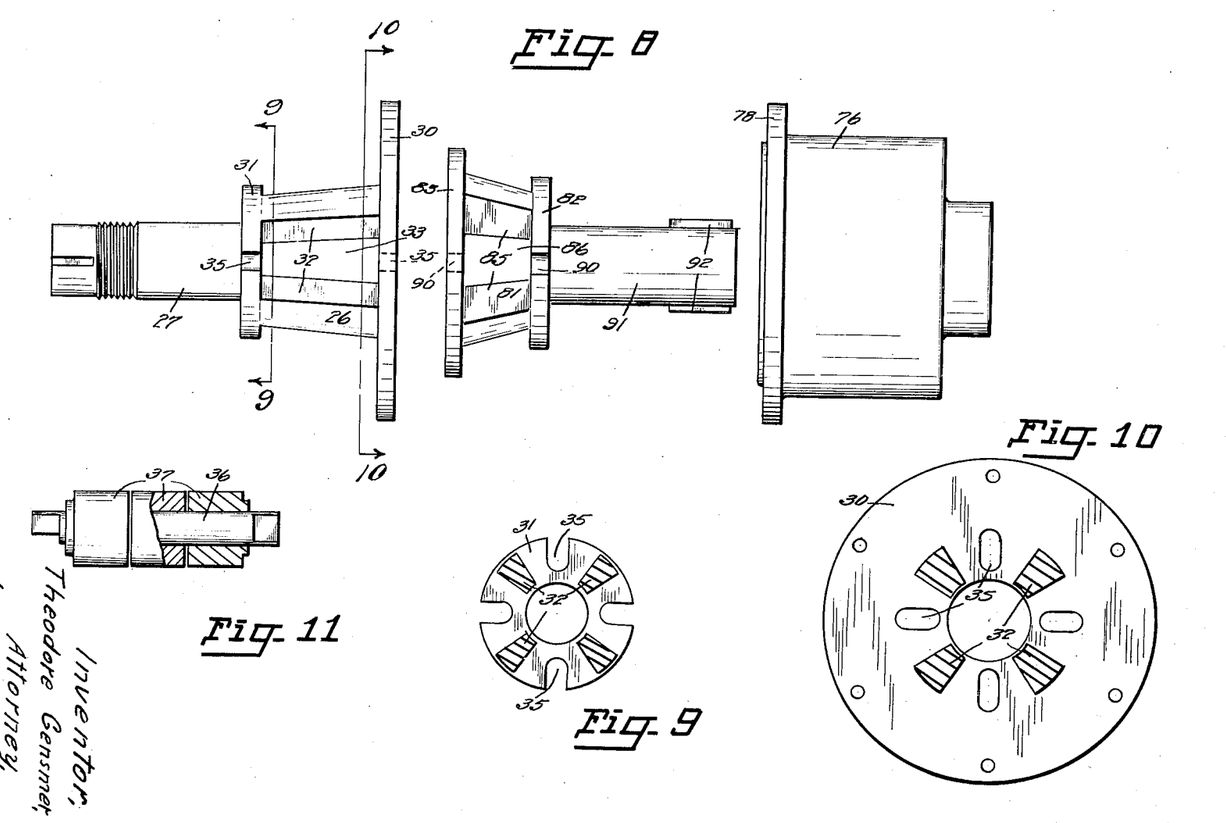
Fig. 8 is a view in side elevation of the fore and rear driving roller-bearing frames and reversing casing, such elements being separated for better illustration.
Fig. 9 is a cross-sectional view on line 9—9 of Fig. 8.
Fig. 10 is a cross-sectional view on line 10—10 of Fig. 8.
Fig. 11 is a detached view in side elevation partly in section of the forward-motion roller elements.

A rotatable frame 26, see Fig. 8, is mounted in the chamber 17 and is formed with a tubular shank 27 through whose bore the driving member 23 extends and which in turn is journaled in an axial bore in the hub 15 of the cylinder. Adjacent to its rearward end the shank 27 is provided with external screw-threads upon which lock-nuts 28 are provided securing the frame in rotatable relation with the cylinder 16 with suitable thrust bearings therebetween. Said rotatable frame within the chamber 17 comprises circular end disks 30 and 31, the latter of which is directly connected with the shank 27. Said disks are rigidly connected by tapered and inclined bars 32 arranged in evenly spaced relation to provide roller-receiving spaces 33 therebetween. In the opposing faces of said disks radially slotted recesses 35 are formed to provide aligned seats in each said space for the projecting squared ends of roller spindles 36. Rotatably mounted on each of the spindles 36 are a plurality of individual cylindrical rollers 37 of equal diameters. The spindles 36 are mounted in the recesses 35 to provide movement in radial directions in order that the peripheral surfaces of the rollers will bear evenly on the opposite sides of the bearing face of the cylinder and the cone 25 and also a relatively slight limit of play in lateral directions is provided.

Keyed to the driving member 23 at 38 is a clutch-plate 40 which is formed from its forward side with an annular chamber 41 having a peripheral wall 42. Keyed to the tubular shank 27 of the rotatable frame is a flange-plate 43 extending over the open side of the clutch chamber 41. Upon the rearward side of said flange-plate and extending within the chamber 41 are a pair of clutch-shoes 45 each of which is pivoted at one end in opposite relation as at 46 and is formed with an outer circular bearing-surface of substantially the same radius as the peripheral wall 42 of the clutch chamber against which they are adapted to be operated. The free end of each of said shoes extends in the same circular direction to within a short distance of the pivot end of the oppositely corresponding shoe.

A pin 47 is rigidly mounted in the free end of each said shoe each extending laterally into an aperture 48 of the flange-plate 43. A stud 49 is slidable in a bore 50 formed in the flange-plate and is yieldingly urged into contact with each said pin by a coil-spring 50' interposed between said stud and an adjustment screw-plug 50" whereby the shoes 45 are maintained out of engagement with the clutch-wall 42 excepting as provided by the following described devices.

Pivotally mounted in the flange-plate 43 between each of the contiguous, opposing ends of the shoes 45 is a dog 51 to whose spindle 52 extending through and upon the opposite side of the flange-plate is keyed a governor-arm 53 having upon its opposite end a weight 55. The centrifugal force exerted by the rotary motion of the flange-plate causes the weighted ends of said arms to fly outwardly, more or less to rotate the spindle 52 to engage the dogs 51 with the respective free ends of the clutch-shoes whereby the latter are expanded outwardly upon a predetermined rotary speed of the frame 26 as regulated by the pressure of the spring to connect the flange-plate 43 with the clutch-plate 40.

A cylindrical box 56 is provided with a chamber 57 in which the clutch-plate 40 is disposed and is formed with a plurality of lugs 58 extending forwardly into slots 60 in the periphery of the flange-plate 43 whereby the box and flange-plate are rotated together. Said box is provided with a recessed shank 61 with journaled bearings in the rear end of the housing and extends rearwardly to a connection with the drive-shaft 62 of the car by means of the universal joint 63.

The shank 61 is axially recessed to provide a journal-support at 65 for the rear end 66 of the driving-member 23 and to provide space for a coil-spring 67 about said driving-member which is interposed between adjustable nuts 68 on the driving-member and the clutch-plate 40 whereby the driving-member is yieldingly urged in rearward directions to engage the cone 25 with the rollers 37. The clutch-plate is splined upon the key 38 and the thrust thereof is received by the flange-plate 43 which is keyed rigidly upon the frame 26 with thrust-bearings 70 between the clutch-plate and the flange-plate. Opportunity to adjust the tension of the spring 67 by varying the position of the nuts 67 is afforded through openings 71 in the shank 61.

At the forward end of the housing the driving-member 23 is extended through the housing whereat it is suitably journaled and is connected at its forward end by a splined joint with the crank-shaft 72 of the motor 73. Adjacent the cone 25 upon the drive-member is formed a rear-driving cone 75 having its smaller end directed towards the forward end of the housing and oppositely to that of the cone 25.

A casing 76 formed with a chamber 77 is bolted through a peripheral flange 78 to the disk 30. The wall 80 of the chamber 77 is inclined in the same direction and in the same pitch as the inclination of the cone 75. A rotatable frame 81 substantially similar to the frame 26 is positioned within the chamber 77 and comprises forward and rear disks 82 and 83, respectively, tapered bars 85 connecting said disks having roller spaces 86 therebetween to receive rollers 87 mounted upon spindles 88 of similar construction to the spindles 36 seated in slots 90 in the disks 82 and 83 and inclined in paral'el with the wall 80 and cone 75. The frame 81 is provided with a shank 91 having an axial bore through which the driving member is extended. Said shank is keyed in the housing at 92 to prevent the rotation of the frame 81.

An actuating lever 93 is pivoted at 95 at its lower end in the car-frame. Intermediate its ends said lever is connected by the usual yoke and collar connection 96 with the annular slot 97 of a collar 98 pinned to the driving-member 23 forward of the housing. A link 100 connects the upper end of the lever 93 with a crank-arm 101 of a pivoted foot-lever 102 which is provided with a swingable foot-pedal 103 and a latching-dog 105 through which the driving-member may be retained in neutral position as will be more fully explained.

Figure 1:
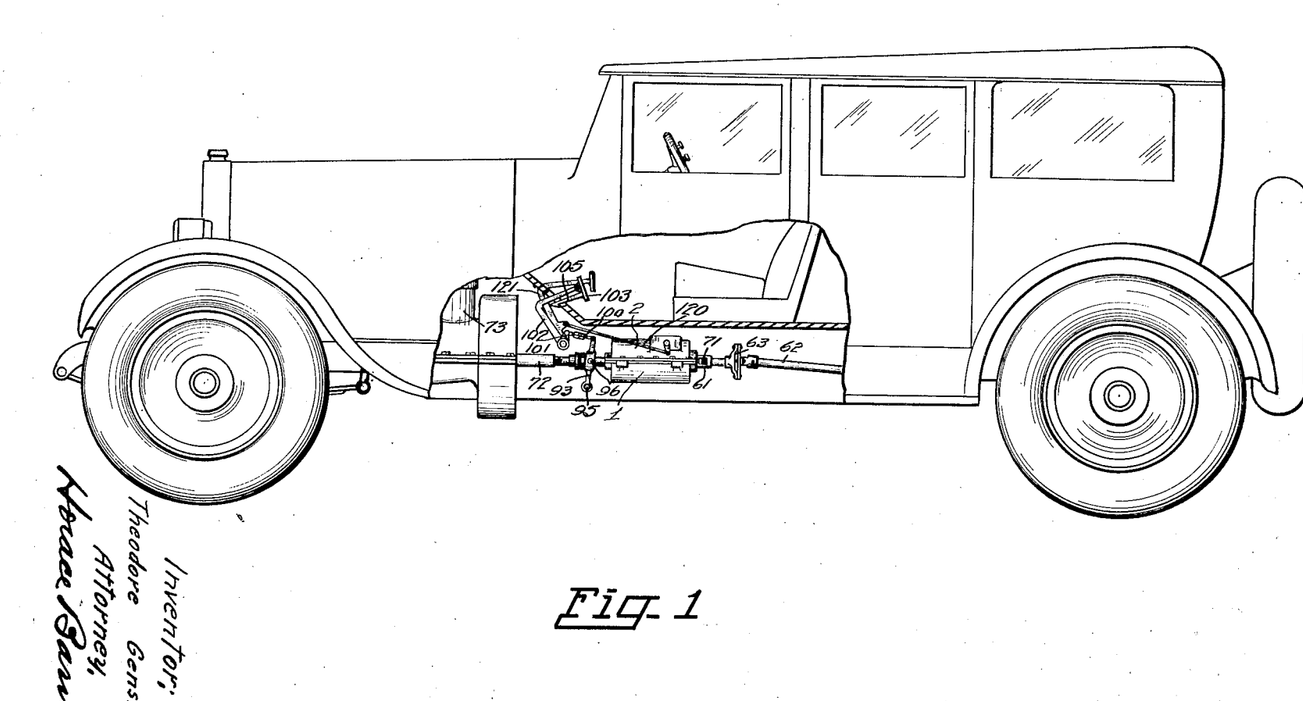
Figure 1 is a view in side elevation of my improved automatic variable speed transmission apparatus mounted in operative condition in an automobile which is shown partially broken away to disclose said apparatus.
Figure 2:
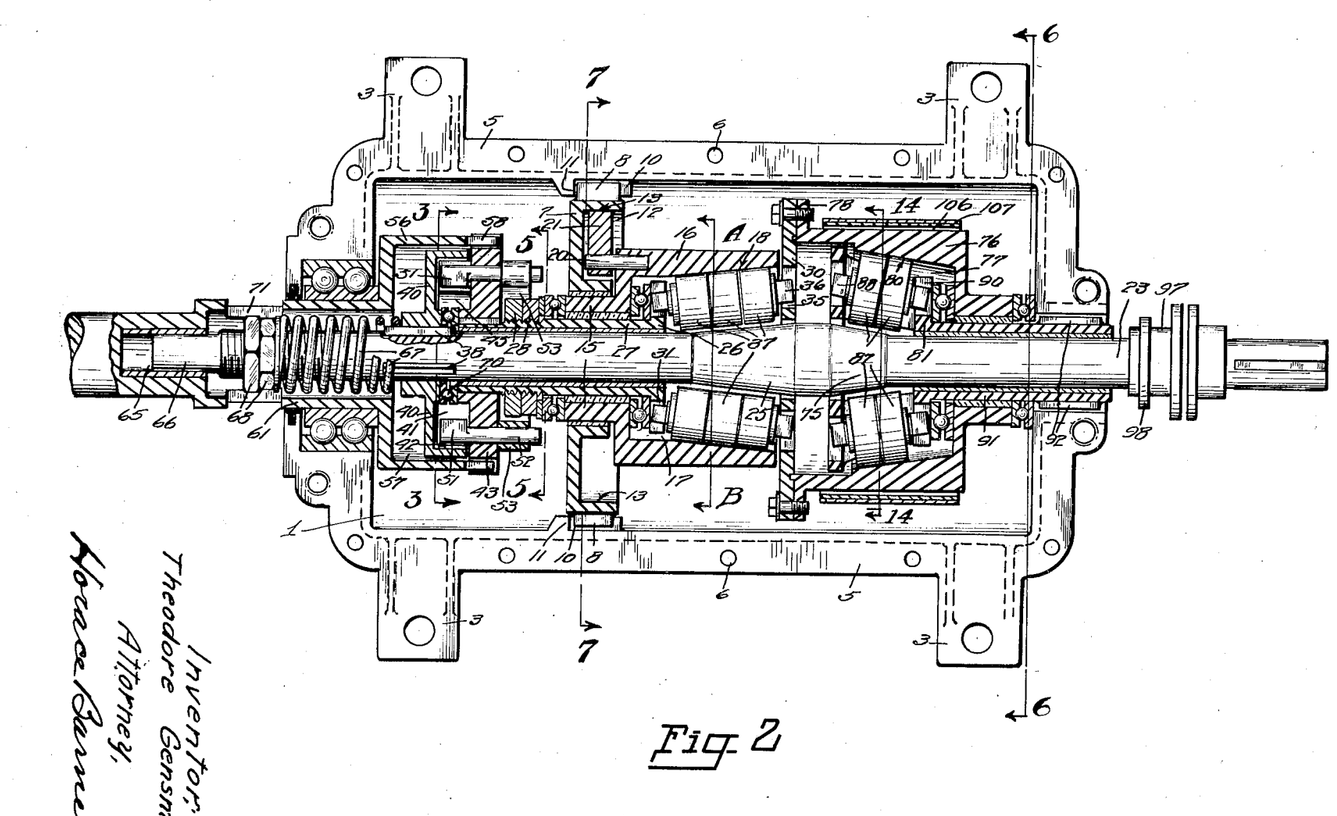
Fig. 2 is a top plan view of my invention with the upper section of the housing removed and showing the operative parts partly in plan and partly in horizontal cross-section and in their neutral position.
Figures 3, 4:
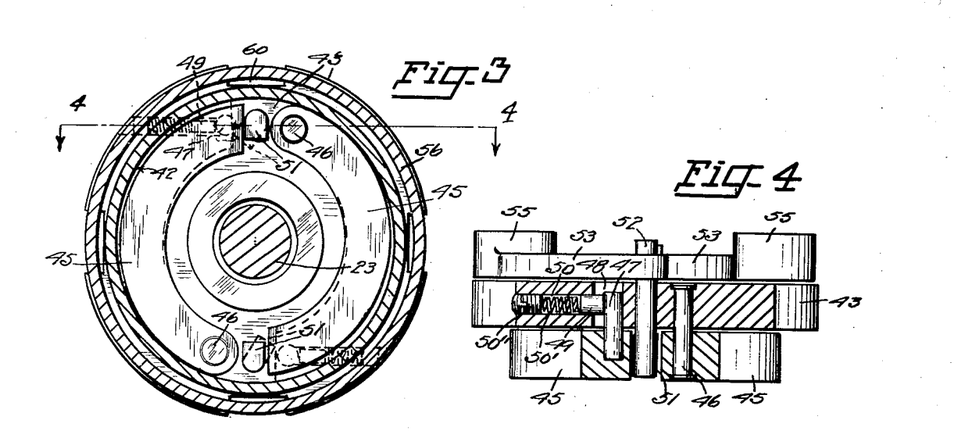
Fig. 3 is a view in cross-section on line 3—3 of Fig. 2.
Fig. 4 is a view in cross-section on line 4—4 of Fig. 3.
Figure 5:
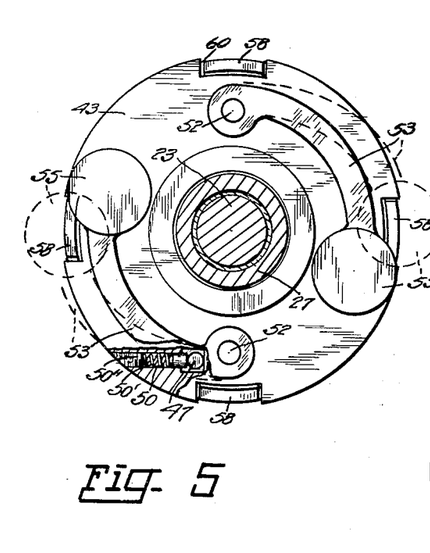
Fig. 5 is a view in cross-section on line 5—5 of Fig. 2.
Figure 6:
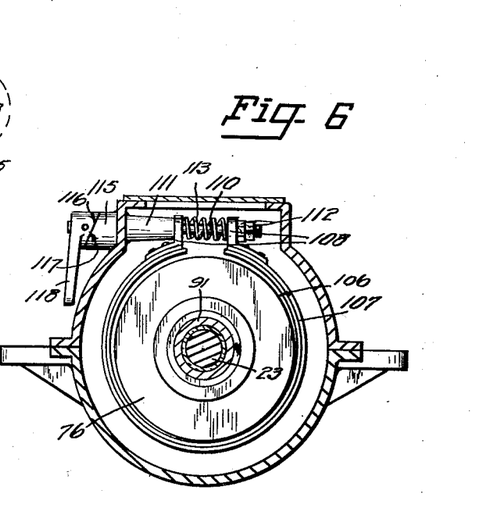
Fig. 6 is a view in cross-section on line 6—6 of Fig. 2.
Figure 7:
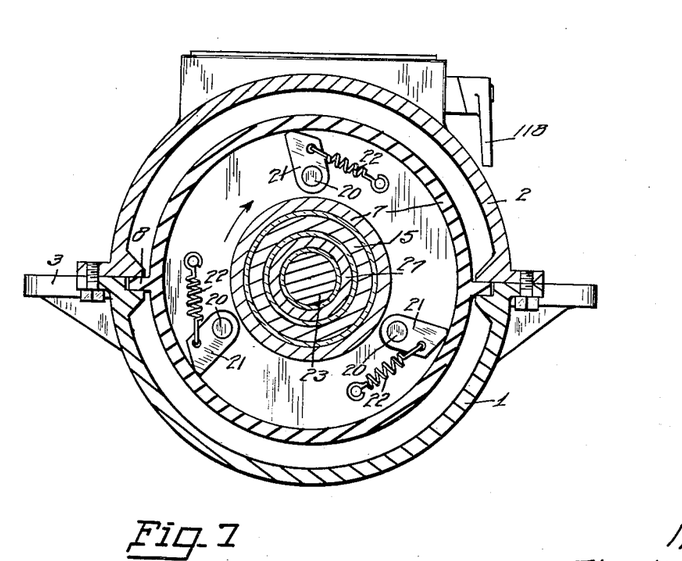
Fig. 7 is a cross-sectional view on line 7—7 of Fig. 2.

In the form of the invention illustrated in Fig. 2 the exterior cylindrical surface 106 of the casing 76 serves as a brake-drum. A brake-band 107 extends about said drum and is provided with slotted lugs 108. A pin 110 is received within said lug-slots and is supported for oscillation in a boss 111 integral or rigidly mounted at the upper section of the housing and is formed with a horizontally disposed bore through which said pin extends. The pin 110 is screw-threaded at its inner end to receive nuts 112 engaging upon the outer side of one of said lugs while the other lug bears against the lugs 111. A coil-spring 113 upon said pin boss 111. A coil-spring 113 upon said pin between the lugs yieldingly presses the lugs against the boss and nuts to resiliently maintain the brake-band in open inoperative position.

A boss 115 upon the outer side of the housing is in line with the boss 111 and is bored in register therewith through which the pin 110 extends. The boss 115 is formed with an inclined face 116 against which the inclined face 117 of a crank-arm 118 keyed to the pin 110 is opposed. A link 120 connects the crank-arm 118 with a foot-controlled brake-lever 121. The mode of operation of said brake devices is believed to be readily apparent.

Figure 15:
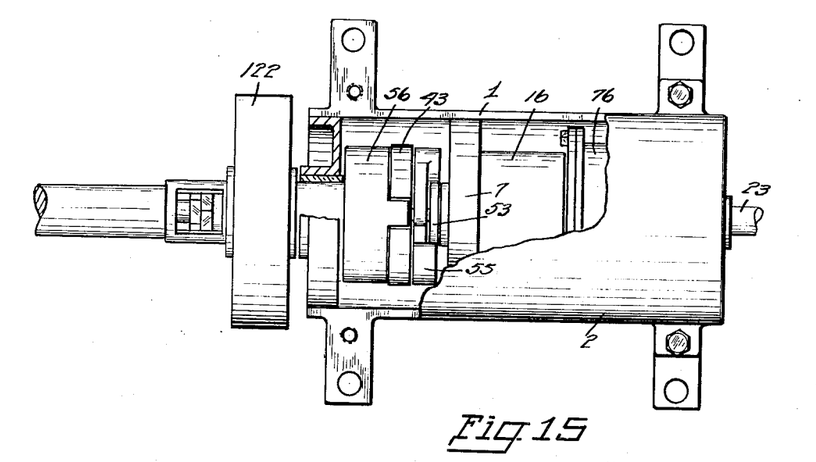
Fig. 15 is a top plan view partly broken away of a form of the invention slightly modified from that shown in the preceding views.

In the form of the invention illustrated in Fig. 15 I have illustrated my improved transmission devices with a brake-drum 122 keyed upon the shank 61 as a substitute for the braking devices heretofore described and shown unprovided with brake-band, which will be of the usual form now employed with such devices.

The operation of my invention may be described as follows: Referring to Fig. 2 wherein the apparatus is illustrated in this neutral position, as when the driving-member 23 is retained in neutral position by the latching-dog 105 it will be seen that the said driving-member which is in direct driving connection with the motor crank shaft may be shifted longitudinally forwardly to engage the cone 75 with the rollers 87 to actuate the vehicle in reverse directions by pressing the foot-lever 102 to admit of the coil-spring 67 asserting itself to actuate the driving member 23 to bring the cone 25 into contact with the rollers 37.

The car motor 73 being in motion and the cone 25 being thrust forwardly in pressed contact with rollers 37 will be pressed against the bearing-face 18 of the cylinder through the freedom of movement allowed to the spindles 36 in the recesses 35 in which the spindles are supported. Due to the similar cone conformation of the opposing surfaces of the cone and the bearing-face 18 with the rollers 28 pressed therebetween of uniform diameters the greater diameters of said cone surfaces at the forward end of the rollers will cause a relatively slight but effective displacement of the axial line of the spindles 36 relative to the axis of the driving member so that said spindles will lie slightly askew thereto and a considerable torque force is generated upon the frame 26 in carrying the rollers impelling it in the same rotary direction as the driving member. The frame being connected through the shank 27 and flange-plate 43 with the cylindrical box 56 that is connected with the drive shaft of the car its motion is communicated to the driving wheels.

Figure 13:
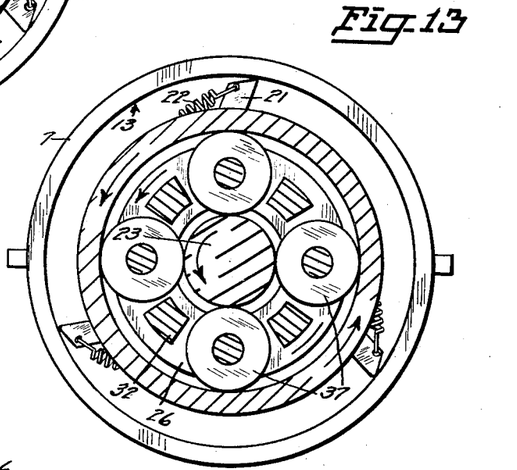
Fig. 13 is a view similar to Fig. 12 illustrating the movement of the parts in forward motion at high speed.

Under relatively slight loads and at high speeds the driving member 23, the cylinder 16, and the frame 26 will all move in unison at the same rate of rotation and in the same direction while the rollers 37 will move with the frame without independent rotary movement. This is the so-called high speed in the apparatus and is practically a direct drive to the rear axle. This high speed position of the apparatus is illustrated in Fig. 13. In such high speed the governor-arms 53 will be thrown outwardly by centrifugal force to actuate the dogs 51 upon clutch-shoes 45 to engage the wall 42 of the clutch-plate 40 to more positively connect the driving member with the flange-plate 43 which in turn is connected to the drive shaft by the cylindrical box 56.

As a heavier load is thrown upon the transmission, such as in traveling upon an upgrade, by throttling down the engine to deliver less power upon the motor the cylinder 16 will tend to lag to greater or less degree behind the speed of the cone. This condition will cause the rollers 37 to rotate more or less according to the difference in the rate of rotation of the cone and cylinder and thereby reducing the speed of the frame 26 to a mean between the speed of the cone and the cylinder affording thereby a reduction in speed to the driving wheels and a proportionate increase in power. At the same time the reduction in speed of the frame will cause a lessening of the throw of the governor-arms 56 causing a more or less reduced frictional engagement of the clutch-shoes 45 upon the clutch-plate 40 and causing the flow of power to the drive shaft to pass more or less through the flange-plate 43.

This comprises the intermediate drives of the car, such intermediate changes of speed being theoretically infinite between the already described high speed or direct drive and the extreme low speed to be presently explained. The lagging action of the cylinder is determined by the load or driving power and operates automatically in both directions, that of increase or reduction of speed to give more or less power with corresponding reduction or increase in power applying to the drive wheels. The employment of the governor devices connecting the drive shaft with the flange plate tends to increase the range of action of the apparatus in such intermediate drives.

Figure 12:
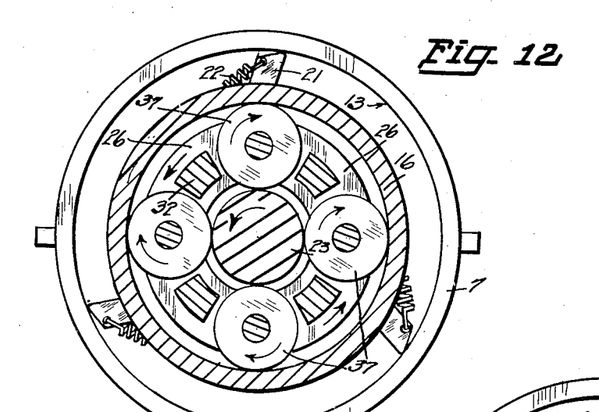
Fig. 12 is a view in cross-section on line A—B of Fig. 2, illustrating the movements of the parts when in forward motion at low speed.

When the thrust of the rollers 37 in their rotation is sufficiently great upon the cylinder to cause it to reverse, as it will do under heavy loads, such as in climbing steep hills, the clutch-dogs 21 will assert themselves to lock the cylinder to the bearing-plate 7 and immediately prevent such reverse rotation thereby affording a fixed bearing for the rollers 37 and increasing the leverage provided so that the maximum power may be communicated to the drive wheels as the rate of rotation of the frame 26 to that of the driving cone is practically proportionate to the diameters of the rollers and the mean diameter of the cone. Such low speed condition of the apparatus is indicated diagrammatically in Fig. 12.

Immediately the heavy load is removed from the apparatus, as in the car reaching a more level roadway, the cylinder will immediately begin to move with the frame and thereby releasing the clutch-dogs 21 and increasing the driving speed. This entire series of change speeds is completely automatic and will operate continuously without thought or control on the part of the driver, changing toward high speed as level or flat roads are met, and shifting the intermediate speeds into extreme low, if necessary, that will deliver the maximum of power of the engine as the steeper hills are met.

The driver may operate the car with ease with only the gas throttle to control. The extreme power delivered to the apparatus in all variations in application of the power to the driving wheels is performed instantly and inerrantly as the requirements upon the proper performance of the car vary.

Figure 14:
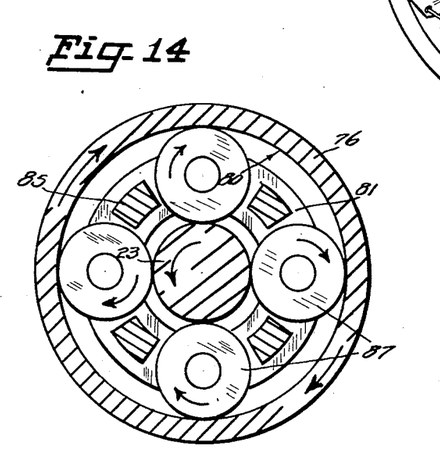
Fig. 14 is a view in cross-section on line 14—14 of Fig. 2 illustrating the movement of the parts in reverse motion.

In reversing the motion of the car the foot pedal is pressed forwardly, as heretofore described, to cause the cone 75 to engage the rollers 87 to reversably actuate them. The frame 81, in which said rollers are mounted, being fixedly secured through the key 97, the rotation of the rollers 87 on the cone 75 will cause the casing 76 with which they are in contact to rotate in a reverse direction to that of the driving member. Said casing being rigidly connected to the frame 26 its motion is communicated to the driving shaft of the car. The operation of the reverse mechanism of my invention is indicated diagrammatically in Fig. 14.

Having described my invention, what I claim is:

1. In variable speed transmission apparatus, a housing, a circular bearing-plate rigidly mounted interiorly of said housing, having an interior, annular chamber therein, a cylinder rotatively mounted in said bearing-plate having an axially arranged conical chamber therein, spring-pressed clutch-dogs mounted upon said cylinder and disposed within said plate-chamber engageable with the wall thereof to prevent the reverse rotation of the cylinder, a rotatable frame mounted in said cylinder-chamber and operatively connected with a driven-shaft, a plurality of rollers supported in said frame in engagement with the walls of said cylinder-chamber, a driving-member journaled axially of said housing and slidably connected to a power-driven shaft and including a cone in parallel with the walls of said cylinder-chamber, and means to resiliently engage said driving-member with said rollers.

2. In variable speed transmission apparatus, a housing, a circular bearing-plate rigidly mounted interiorly of said housing, having an interior, annular chamber therein, a cylinder rotatively mounted in said bearing-plate having an axially arranged conical chamber therein, spring-pressed clutch-dogs mounted upon said cylinder and disposed within said plate-chamber engageable with the wall thereof to prevent the reverse rotation of the cylinder, a rotatable frame mounted in said cylinder-chamber and operatively connected with a driven-shaft, a plurality of rollers supported in said frame in engagement with the walls of said cylinder-chamber, a driving-member journaled axially of said housing and slidably connected to a power-driven shaft and including a cone in parallel with the walls of said cylinder-chamber, a governor-device arranged to frictionally engage said frame with said driving-member, and means to resiliently engage said driving-member with said rollers.

3. In variable speed transmission apparatus, a housing, a circular bearing-plate rigidly mounted interiorly of said housing, having an interior, annular chamber therein, a cylinder rotatively mounted in said bearing-plate having an axially arranged conical chamber therein, spring-pressed clutch-dogs mounted upon said cylinder and disposed within said plate-chamber engageable with the wall thereof to prevent the reverse rotation of the cylinder, a rotatable frame mounted in said cylinder-chamber and operatively connected with a driven-shaft, a plurality of rollers supported in said frame in engagement with the walls of said cylinder-chamber, a driving-member journaled axially of said housing and slidably connected to a power-driven shaft and including a cone in parallel with the walls of said cylinder-chamber, means to resiliently engage said driving-member with said rollers, and an exteriorly cylindrical casing rigidly connected to said frame affording a brake-drum, a brake-band, and means to actuate said brake devices.

4. In variable speed transmission apparatus, a housing, a circular bearing-plate rigidly mounted interiorly of said housing, having an interior, annular chamber therein, a cylinder rotatively mounted in said bearing-plate having an axially arranged conical chamber therein, spring-pressed clutch-dogs mounted upon said cylinder and disposed within said plate-chamber engageable with the wall thereof to prevent the reverse rotation of the cylinder, a rotatable frame mounted in said cylinder-chamber and operatively connected with a driven-shaft, a plurality of rollers supported in said frame in engagement with the walls of said cylinder-chamber, a driving-member journaled axially of said housing and slidably connected to a power-driven shaft and including a cone in parallel with the walls of said cylinder-chamber, means to resiliently engage said driving-member with said rollers, a governor-device arranged to frictionally engage said frame with said driving-member, and an exteriorly cylindrical casing rigidly connected to said frame affording a brake-drum, a brake-band, and means to actuate said brake devices.

5. In variable speed transmission apparatus, a housing, a bearing-plate rigidly mounted in said housing, a cylinder rotatably mounted in said bearing-plate having an axially disposed conical chamber therein, means to prevent the reverse rotation of said cylinder, a rotatable frame within said cylinder-chamber operatively connected with a driven-shaft, a plurality of spindles mounted in said frame, a plurality of rollers upon each of said spindles, a driving-member connected to a power-driven shaft and having a cone therein, means to yieldingly press said cone into engagement with said rollers, and means to actuate said driving-member longitudinally to disengage the cone from said rollers.

6. In variable speed transmission apparatus, a housing, a bearing-plate rigidly mounted in said housing, a cylinder rotatably mounted in said bearing-plate having an axially disposed conical chamber therein, means to prevent the reverse rotation of said cylinder, a rotatable frame within said cylinder-chamber operatively connected with a driven-shaft, a plurality of spindles mounted in said frame, having limited movements in lateral and radial directions, a plurality of rollers upon each of said spindles, a driving-member connected to a power-driven shaft and having a cone therein, means to yieldingly press said cone into engagement with said rollers, and means to actuate said driving-member longitudinally to disengage the cone from said rollers.

7. In variable speed transmission apparatus, a housing, a bearing-plate rigidly mounted in said housing, a cylinder rotatably mounted in said bearing-plate having an axially disposed conical chamber therein, means to prevent the reverse rotation of said cylinder, a rotatable frame within said cylinder-chamber operatively connected with a driven-shaft, a plurality of spindles mounted in said frame, a plurality of rollers upon each of said spindles, a driving-member connected to a power-driven shaft and having a cone therein, means to yieldingly press said cone into engagement with said rollers, means to actuate said driving-member longitudinally to disengage the cone from said rollers, and a governor-device operative by centrifugal force to connect said frame-member with said driving-member.

8. In variable speed transmission apparatus, a housing, a bearing-plate rigidly mounted in said housing, a cylinder rotatably mounted in said bearing-plate having an axially disposed conical chamber therein, means to prevent the reverse rotation of said cylinder, a rotatable frame within said cylinder-chamber operatively connected with a driven-shaft, a plurality of spindles mounted in said frame, having limited movements in lateral and radial directions, a plurality of rollers upon each of said spindles, a driving-member connected to a power-driven shaft and having a cone therein, means to yieldingly press said cone into engagement with said rollers, means to actuate said driving-member longitudinally to disengage the cone from said rollers, and a governor-device operative by centrifugal force to connect said frame-member with said driving-member.

9. In variable speed transmission apparatus, a housing, a bearing-plate rigidly mounted in said housing, a cylinder rotatably mounted in said bearing-plate having an axially disposed conical chamber therein, means to prevent the reverse rotation of said cylinder, a rotatable frame within said cylinder-chamber operatively connected with a driven-shaft, a plurality of spindles mounted in said frame, having limited movements in lateral and radial directions, a plurality of rollers upon each of said spindles, a driving-member connected to a power-driven shaft and having a cone therein, means to yieldingly press said cone into engagement with said rollers, means to actuate said driving-member longitudinally to disengage the cone from said rollers, a clutch-plate keyed to said driving-member, a flange-plate keyed to said frame, clutch-shoes pivotally mounted upon said flange-plate and engageable with said clutch-plate, and centrifugally actuated devices operatively mounted upon said flange-plate arranged to frictionally engage said clutch-shoes with the clutch-plate.

10. In variable speed transmission apparatus, a housing, a bearing-plate rigidly mounted in said housing, a cylinder rotatably mounted in said bearing-plate having an axially disposed conical chamber therein, means to prevent the reverse rotation of said cylinder, a rotatable frame within said cylinder-chamber operatively connected with a driven-shaft, a plurality of spindles mounted in said frame, having limited movements in lateral and radial directions, a plurality of rollers upon each of said spindles, a driving-member connected to a power-driven shaft and having a cone therein, means to yieldingly press said cone into engagement with said rollers, means to actuate said driving-member longitudinally to disengage the cone from said rollers, a clutch-plate keyed to said driving-member, a flange-plate keyed to said frame, clutch-shoes pivotally mounted upon said flange-plate and engageable with said clutch-plate, centrifugally actuated devices operatively mounted upon said flange-plate arranged to frictionally engage said clutch-shoes with the clutch-plate, and means to vary the amount of tension required to actuate said clutch-shoes.

11. In variable speed transmission apparatus, a rotatable cylinder having a conical chamber therein, means to prevent the reverse rotation of said cylinder, a rotatable frame within said cylinder-chamber having a flange-plate rigidly connected thereto, means to connect said flange-plate to a driven-shaft, a plurality of spindles mounted in said frame in parallel with walls of said conical chamber, a plurality of rollers upon each of said spindles, a driving-member connected to a power-shaft having a cone therein, a clutch-plate keyed to said driving-member, and centrifugally actuated devices to connect said flange-plate with said clutch-plate.

12. In variable speed transmission apparatus, a rotatable cylinder having a conical chamber therein, means to prevent the reverse rotation of said cylinder, a rotatable frame within said cylinder-chamber having a flange-plate rigidly connected thereto, means to connect said flange-plate to a driven-shaft, a plurality of spindles mounted in said frame in parallel with walls of said conical chamber and having limited movements in lateral and radial directions, a plurality of rollers upon each of said spindles, a driving-member connected to a power-shaft having a cone therein, a clutch-plate keyed to said driving-member, and centrifugally actuated devices to connect said flange-plate with said clutch-plate.

13. In variable speed transmission apparatus, a rotatable longitudinally shiftable driving-member provided with a cone-portion, a frame rotatably mounted about said driving-member connected with a driven shaft, a plurality of rollers supported in said frame with their axes in parallel with the surface of said cone-portion, and a bearing-member exteriorly of said rollers having an interior bearing-wall for said rollers of the same inclination as said cone-portion and mounted for rotation only in the same direction as the rotation of said frame.

14. In variable speed transmission apparatus, a rotatable longitudinally shiftable driving-member provided with a cone-portion, a frame rotatably mounted about said driving-member connected with a driven shaft, a plurality of rollers supported in said frame with their axes in parallel with the surface of said cone-portion, a bearing-member exteriorly of said rollers having an interior bearing-wall for said rollers of the same inclination as said cone-portion and mounted for rotation only in the same direction as the rotation of said frame, and means to connect said frame and said driving-member.

15. In variable speed transmission apparatus, a rotatable longitudinally shiftable driving-member provided with a cone-portion, a frame rotatably mounted about said driving-member connected with a driven-shaft, a plurality of rollers supported in said frame with their axes in parallel with the surface of said cone-portion, a bearing-member exteriorly of said rollers having an interior bearing-wall for said rollers of the same inclination as said cone-portion and mounted for rotation only in the same direction as the rotation of said frame, and means to frictionally connect said frame with said driving-member.

16. In variable speed transmission apparatus, a rotatable longitudinally shiftable driving-member provided with a cone-portion, a frame rotatably mounted about said driving-member connected with a driven shaft, a plurality of rollers supported in said frame with their axes in parallel with the surface of said cone-portion, a bearing-member exteriorly of said rollers having an interior bearing-wall for said rollers of the same inclination as said cone-portion and mounted for rotation only in the same direction as the rotation of said frame, and centrifugally actuated devices to frictionally connect said frame with said driving-member.

17. In variable speed transmission apparatus, a rotatable longitudinally shiftable driving-member provided with a cone-portion, a frame rotatably mounted about said driving-member connected with a driven shaft, a plurality of rollers supported in said frame with their axes in parallel with the surface of said cone-portion, a bearing-member exteriorly of said rollers having an interior bearing-wall for said rollers of the same inclination as said cone-portion and mounted for rotation only in the same direction as the rotation of said frame, a clutch-plate keyed to said driving-member, a flange-plate rigidly mounted with said frame, and centrifugally actuated clutch devices connecting said flange-plate to said clutch-plate.

18. In variable speed transmission apparatus, a rotatable longitudinally shiftable driving-member provided with a cone-portion, a frame rotatably mounted about said driving-member connected with a driven shaft, a plurality of rollers supported in said frame with their axes in parallel with the surface of said cone-portion and free to move in lateral and radial directions, and a bearing-member exteriorly of said rollers having an interior bearing-wall for said rollers of the same inclination as said cone-portion and mounted for rotation only in the same direction as the rotation of said frame.

19. In variable speed transmission apparatus, a rotatable longitudinally shiftable driving-member provided with a cone-portion, a frame rotatably mounted about said driving-member connected with a driven shaft, a plurality of rollers supported in said frame with their axes in parallel with the surface of said cone-portion, said rollers having limited movements in lateral and radial directions, a bearing-member exteriorly of said rollers having an interior bearing-wall for said rollers of the same inclination as said cone-portion and mounted for rotation only in the same direction as the rotation of said frame, and means to connect said frame and said driving-member.

20. In variable speed transmission apparatus, a rotatable longitudinally shiftable driving-member provided with a cone-portion, a frame rotatably mounted about said driving-member connected with a driven shaft, a plurality of rollers supported in said frame with their axes in parallel with the surface of said cone-portion, said rollers having limited movements in lateral and radial directions, a bearing-member exteriorly of said rollers having an interior bearing-wall for said rollers of the same inclination as said cone-portion and mounted for rotation only in the same direction as the rotation of said frame, and centrifugally actuated devices to frictionally connect said frame with said driving-member.

21. In variable speed transmission apparatus, a rotatable longitudinally shiftable driving-member provided with a cone-portion, a frame rotatably mounted about said driving-member and connected to a driven-shaft, a plurality of spindles supported in said frame with their axes in parallel with the surface of said cone-portion, a plurality of rollers mounted on each said spindle, a bearing-member exteriorly of said rollers having an interior bearing-wall for said rollers of the same inclination as said cone-portion and mounted for rotation only in the same direction as that of said frame.

22. In variable speed transmission apparatus, a rotatable longitudinally shiftable driving-member provided with a cone-portion, a frame rotatably mounted about said driving-member and connected to a driven-shaft, a plurality of spindles supported in said frame having limited movements in lateral and radial directions, a plurality of rollers mounted on each said spindle, a bearing-member exteriorly of said rollers having an interior bearing-wall for said rollers of the same inclination as said cone-portion and mounted for rotation only in the same direction as that of said frame.

23. In variable speed transmission apparatus, a housing, a rotatable longitudinally shiftable driving-member formed with a cone-portion, a frame rigidly connected to said housing concentrically about said driving-member, a plurality of rollers supported in said frame having limited movements in lateral and radial directions, and a casing exteriorly of said rollers having an interior bearing-wall for said rollers of the same inclination as said cone-portion, said casing being operatively connected with a driven-shaft.

24. Variable speed transmission apparatus, consisting in a housing, a cylinder rotatably mounted in said housing having an axially arranged conical chamber therein, means to prevent the reverse rotation of said cylinder, a rotatable frame mounted in said cylinder-chamber operatively connected with a driven-shaft, a casing secured to said frame having an axially disposed conical chamber therein, a rigidly mounted frame mounted in said casing-chamber, a longitudinally shiftable driving-member journaled axially of said housing and operatively connected to a power-shaft, said driving-member including two oppositely disposed cones positioned within and parallel to the walls of said cylinder- and casing-chambers, respectively, and a plurality of rollers supported in each of said frames having their axes in parallel with the cone surfaces of said chambers and said cones, respectively.

25. Variable speed transmission apparatus, consisting in a housing, a cylinder rotatably mounted in said housing having an axially arranged conical chamber therein, means to prevent the reverse rotation of said cylinder, a rotatable frame mounted in said cylinder-chamber operatively connected with a driven-shaft, a casing secured to said frame having an axially disposed conical chamber therein, a rigidly mounted frame mounted in said casing-chamber, a longitudinally shiftable driving-member journaled axially of said housing and operatively connected to a power-shaft, said driving-member including two oppositely disposed cones positioned within and parallel to the walls of said cylinder- and casing-chambers, respectively, and a plurality of rollers supported in each of said frames having limited movements in lateral and radial directions.

26. Variable speed transmission apparatus, consisting in a housing, a cylinder rotatably mounted in said housing having an axially arranged conical chamber therein, means to prevent the reverse rotation of said cylinder, a rotatable frame mounted in said cylinder-chamber operatively connected with a driven-shaft, a casing secured to said frame having an axially disposed conical chamber therein, a rigidly mounted frame mounted in said casing-chamber, a longitudinally shiftable driving-member journaled axially of said housing and operatively connected to a power-shaft, said driving-member including two oppositely disposed cones positioned within and parallel to the walls of said cylinder- and casing-chambers, respectively, a plurality of rollers supported in each of said frames having their axes in parallel with the cone surfaces of said chambers and said cones, respectively, and means to connect said rotatable frame and said driving-member.

27. Variable speed transmission apparatus, consisting in a housing, a cylinder rotatably mounted in said housing having an axially arranged conical chamber therein, means to prevent the reverse rotation of said cylinder, a rotatable frame mounted in said cylinder-chamber operatively connected with a driven-shaft, a casing secured to said frame having an axially disposed conical chamber therein, a rigidly mounted frame mounted in said casing-chamber, a longitudinally shiftable driving-member journaled axially of said housing and operatively connected to a power-shaft, said driving-member including two oppositely disposed cones positioned within and parallel to the walls of said cylinder- and casing-chambers, respectively, a plurality of rollers supported in each of said frames having limited movements in lateral and radial directions, and means to connect said rotatable frame and said driving-member.

28. Variable speed transmission apparatus, consisting in a housing, a cylinder rotatably mounted in said housing having an axially arranged conical chamber therein, means to prevent the reverse rotation of said cylinder, a rotatable frame mounted in said cylinder-chamber operatively connected with a driven-shaft, a casing secured to said frame having an axially disposed conical chamber therein, a rigidly mounted frame mounted in said casing-chamber, a longitudinally shiftable driving-member journaled axially of said housing and operatively connected to a power-shaft, said driving-member including two oppositely disposed cones positioned within and parallel to the walls of said cylinder- and casing-chambers, respectively, a plurality of rollers supported in each of said frames having their axes in parallel with the cone surfaces of said chambers and said cones, respectively, and centrifugally actuated devices to frictionally connect said rotatable frame with said driving-member.

29. Variable speed transmission apparatus, consisting in a housing, a cylinder rotatably mounted in said housing having an axially arranged conical chamber therein, means to prevent the reverse rotation of said cylinder, a rotatable frame mounted in said cylinder-chamber operatively connected with a driven-shaft, a casing secured to said frame having an axially disposed conical chamber therein, a rigidly mounted frame mounted in said casing-chamber, a longitudinally shiftable driving-member journaled axially of said housing and operatively connected to a power-shaft, said driving-member including two oppositely disposed cones positioned within and parallel to the walls of said cylinder- and casing-chambers, respectively, a plurality of rollers supported in each of said frames having limited movements in lateral and radial directions, and centrifugally actuated devices to frictionally connect said rotatable frame with said driving-member.

THEODORE GENSMER.